Figure 1:
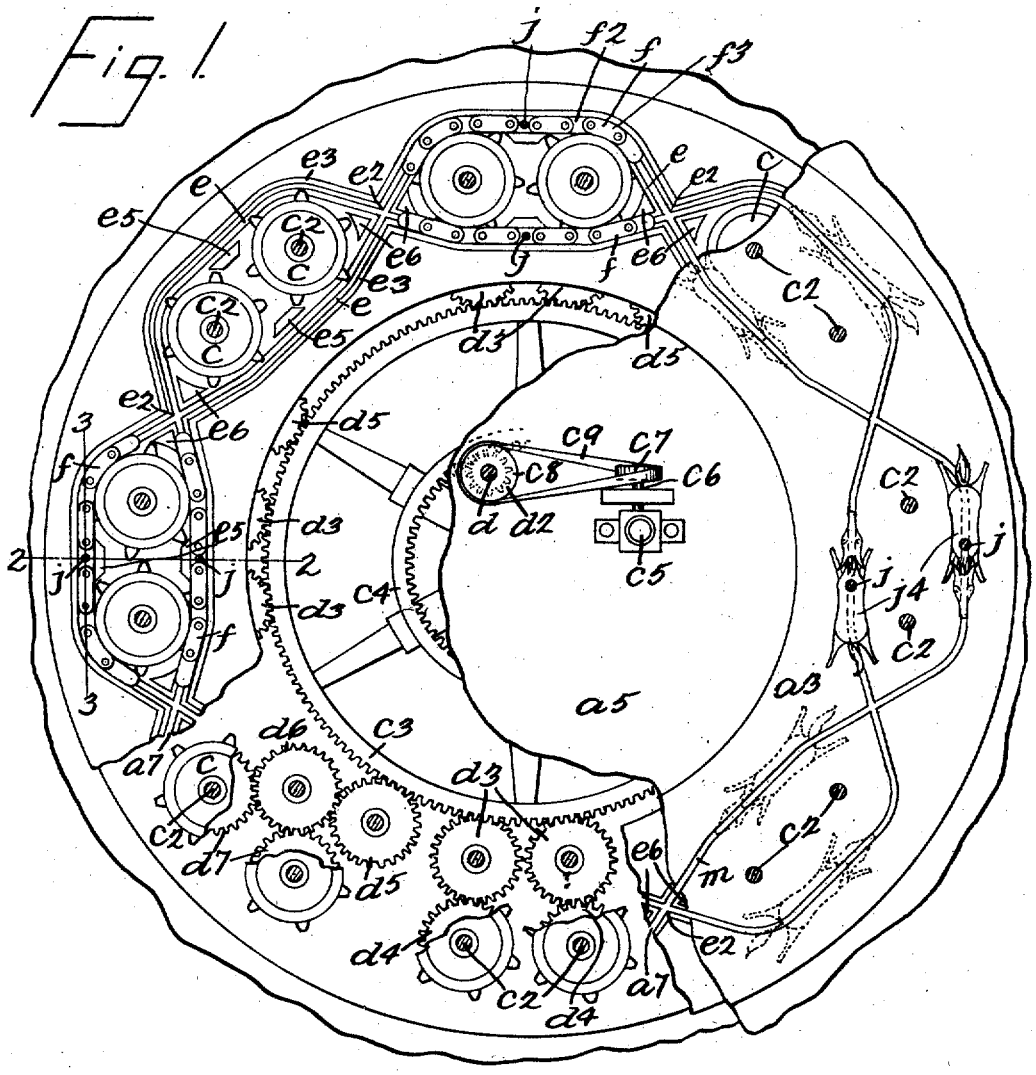

No. 12,435. REISSUED JAN. 9, 1906.

C. F. WEIDNER.

MERRY-GO-ROUND.

APPLICATION FILED OCT. 24, 1905.

2 SHEETS—SHEET 1.

WITNESSES

J. C. Larsen

F. A. Stuart

BY

INVENTOR

Charles F. Weidner

Edgar Tate & Co.

ATTORNEYS

No. 12,435. REISSUED JAN. 9, 1906.
C. F. WEIDNER.
MERRY-GO-ROUND.
APPLICATION FILED OCT. 24, 1905.
2 SHEETS—SHEET 2.
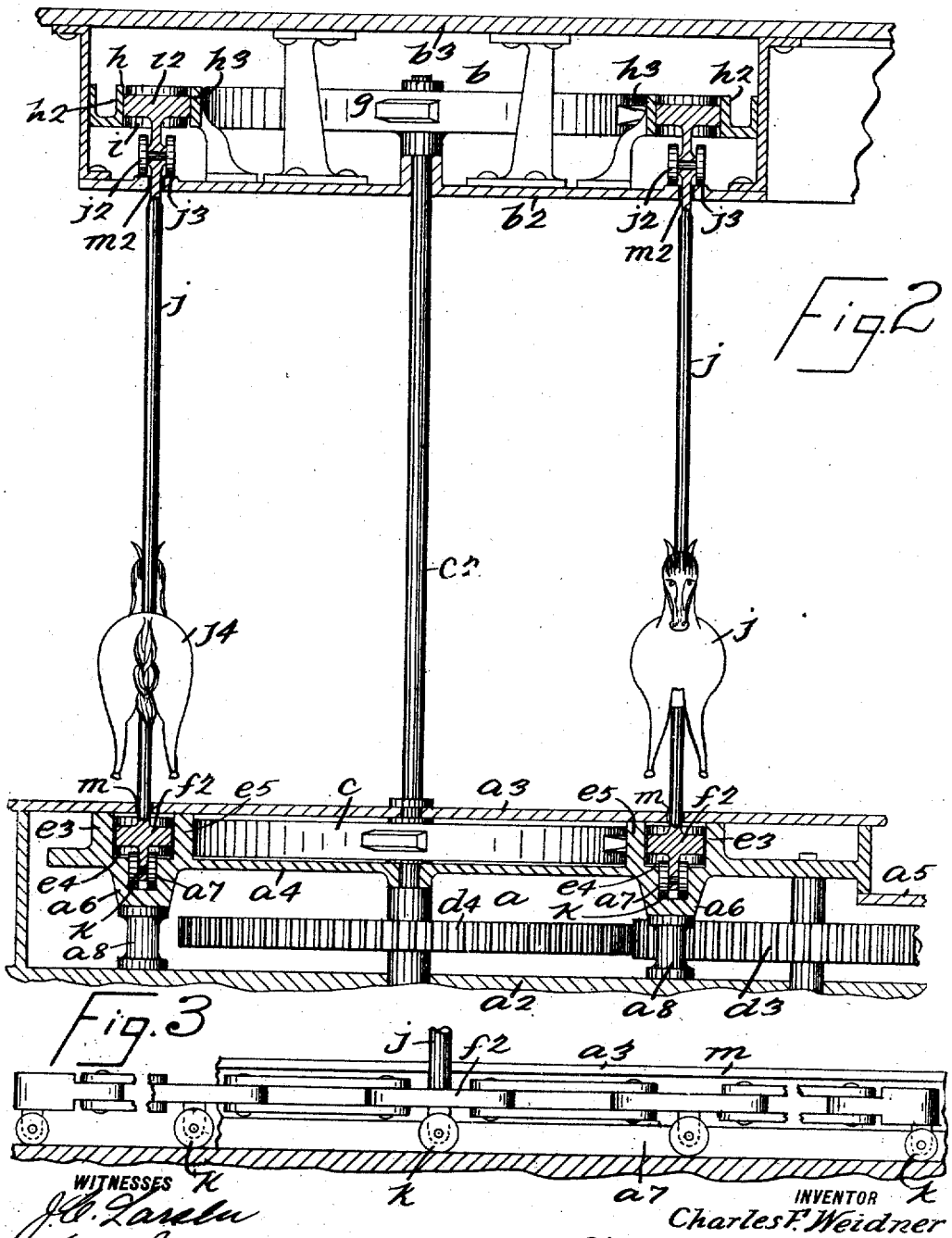
WITNESSES
J. H. Larsen
F. A. Stuart
INVENTOR
Charles F. Weidner
BY
Edgar Tate & Co.
ATTORNEYS

UNITED STATES PATENT OFFICE.

CHARLES F. WEIDNER, OF NEW YORK, N. Y.

MERRY-GO-ROUND.

No. 12,435. Specification of Reissued Letters Patent. Reissued Jan. 9, 1906.

Original No. 772,549, dated October 18, 1904. Application for reissue filed October 24, 1905. Serial No. 284,252.

*To all whom it may concern:*

Be it known that I, CHARLES F. WEIDNER, a citizen of the United States, residing in the borough of Manhattan, city of New York, county of New York, and State of New York, have invented certain new and useful Improvements in Merry-Go-Rounds, of which the following is a specification, such as will enable those skilled in the art to which it appertains to make and use the same.

This invention relates to the class of pleasure devices or apparatus known as "merry-go-rounds;" and the object thereof is to provide an improved device or apparatus of this class which involves supports for horses or other animals or seats vertically arranged and movable in opposite directions through tracks which cross each other at regular intervals, a further object being to provide a device or apparatus of the class specified the operation of which is designed to give pleasure and amusement to children and others; and with these and other objects in view the invention consists in a device or apparatus of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a plan view of the bottom portion of my improved merry-go-round with parts thereof broken away; Fig. 2, a vertical section of one side of the entire apparatus on the line 2 2 of Fig. 1, and Fig. 3 a section at right angles to that of Fig. 2 and taken on the line 3 3 of Fig. 1.

In the practice of my invention I provide an apparatus of the class specified comprising a main bottom portion $a$ and top portion $b$ and details of construction hereinafter described. The bottom portion $a$ comprises a base $a^2$ of any suitable construction, preferably concrete or other solid material, and the bottom portion $a$ is also circular in form, and the top thereof consists of a platform $a^3$, and between the base $a^2$ and platform $a^3$ is a plate or support $a^4$. The platform $a^3$ comprises an outer annular portion in the form of construction shown and a central depressed portion $a^5$, and the plate or support $a^4$ is placed in the outer annular portion of the platform $a^3$ and is also annular in form and is provided with two tortuous bottom bearings $a^6$, in each of which is formed an annular track or way $a^7$, consisting of a depressed or countersunk groove, and beneath the bearings $a^6$ are placed supports $a^8$. Around the central depressed portion $a^5$ of the platform $a^3$ and placed beneath the annular raised portion of said platform and arranged at regular intervals are a plurality of pairs of sprocket-wheels $c$, and each sprocket-wheel of each pair is mounted on a shaft $c^2$, and these shafts $c^2$ are vertically arranged, the lower ends thereof passing downwardly through the annular raised portion of the platform $a^3$ and the upper ends thereof passing upwardly into the top portion $b$ of the apparatus.

Centrally of and beneath the central depressed portion $a^5$ of the platform $a^3$ is mounted a large gear-wheel $c^3$, having a central internal gear $c^4$, and placed on the central portion $a^5$ of the platform is a motor $c^5$, provided with a shaft $c^6$, having a belt-wheel $c^7$, which is geared in connection with another belt-wheel $c^8$ by means of a belt $c^9$, mounted on a vertically-arranged shaft $d$, provided with a small gear-wheel $d^2$, which operates in connection with the gear $c^4$ on the gear-wheel $c^3$, the object of the motor $c^5$ and its connections being to turn the wheel $c^3$, and in the form of construction shown the belt $c^9$ is crossed, so as to turn the wheel $c^3$ to the left; but any suitable means may be provided for turning the wheel $c^3$. The sprocket-wheels $c$ of one pair of said sprocket-wheels are geared in connection directly with the wheel $c^3$ by means of gears $d^3$ operating in connection with corresponding wheels $d^4$ on the shafts $c^2$ of said sprocket-wheels, and the sprocket-wheels $c$ of the adjacent pair of said sprocket-wheels are geared in connection with the wheel $c^3$ by means of a gear-wheel $d^5$ operating in connection with a wheel $d^6$, which operates in connection with two gear-wheels $d^7$ on the shaft $c^2$ of the said last-named pair of sprocket-wheels, and this alternate style of gearing is employed in connection with all the separate pairs of sprocket-wheels and the central gear-wheel $c^3$, and by means of this construction the alternate pairs of sprocket-wheels $c$ are moved in opposite directions.

Around the entire apparatus and beneath the annular raised portion of the platform $a^3$ are placed two endless tracks or ways $e$, and these tracks or ways cross each other between each of the pairs of sprocket-wheels, as shown at $e^2$, and said tracks or ways on the outer and inner sides of each set or pair of sprocket-wheels comprise an outer raised portion or wall $e^3$ and base portion $e^4$, in which the tracks or ways $a^7$ are formed, and upright inner members $e^5$, arranged centrally between the wheels of each pair or set of sprocket-wheels $c$.

In the separate tracks or ways $e$ are mounted a plurality of pairs of short drive-chains $f$, said pairs of drive-chains equaling in number one-half of the number of the pairs or sets of sprocket-wheels $c$ employed, and these chains $f$ are composed of a central block-link $f^2$ and other links $f^3$, and, if desired, the alternate links may all be block-links, and these chains are driven by the sprocket-wheels $c$, as will be readily understood, and in the operation or the apparatus they are carried entirely around and beneath the annular raised portion of the platform $a^3$, said chains being made of such length that they are caught by the sprocket-wheels of one pair before they leave the sprocket-wheels of another pair, and said chains cross the tracks of each other at the points $e^2$, as will be readily understood, and between each pair of the sprocket-wheels $c$ are upright members $e^6$, which form a part of the tracks or ways $e$ in which said chains move.

The top portion $b$ of the apparatus comprises a bottom $b^2$ and a cover $b^3$, and the shafts $c^2$, which are arranged in pairs, as hereinbefore described, and which are provided with the sprocket-wheels $c$, pass upwardly into the top portion $b$, and these shafts are provided within said top portion each with a sprocket-wheel $g$, and the sprocket-wheels $g$ are exactly the same as the sprocket-wheels $c$, and arranged in said top portion $b$ are two tracks or ways $h$, the form and arrangement of which are similar to the tracks or ways $e$ in the bottom portion $a$ of the apparatus; but said tracks or ways $h$ consist of an outer wall $h^2$ and inner bearings $h^3$, similar to the corresponding parts $e^5$ of the tracks or ways $e$, and said tracks or ways $h$ have no bottom, and mounted in said tracks or ways are drive-chains $i$, similar to the drive-chains $f$ in the bottom tracks or ways and composed of central block-links $i^2$ and other links the same as those in the bottom tracks or ways $e$.

The block-links $i^2$ of the top drive-chains $i$ and the block-links $f^2$ of the bottom drive-chains $f$ are rigidly connected by vertically-arranged rods $j$, as clearly shown in Fig. 2, and these rods are provided in the top portion of the apparatus with wheels $j^2$, which travel on tracks or ways $j^3$, and on the rods $j$ in the form of construction shown are placed bodies $j^4$, which in the form of construction shown represent horses, but which may represent any other animals or seats or boxes or supports of any kind or class.

As thus constructed it will be seen that all the shafts $c^2$ are geared in connection with a central drive-wheel $c^3$, and this gear is such that the shafts $c^2$, which are arranged in pairs and which are provided with the sprocket-wheels $c$, turn in opposite directions in each pair and the sprocket-wheel $c$ of each pair is correspondingly operated and the drive-chains $f$ and $i$ are moved in opposite directions and cross the tracks of each other between each pair of sprocket-wheels, and by reason of this construction the horses $j^4$ or other animals or supports employed are moved in opposite directions, the movement thereof being an inward and an outward movement in their respective courses, and by reason of this arrangement a party or parties sitting on the horses or in or on the other supports provided are also moved in opposite directions and along lines which cross each other at regular intervals, whereby a very pleasing and exciting condition is produced. It will also be observed that the alternate links of the drive-chains $f$ are also provided with bearing or supporting rollers $k$, as shown in Fig. 3, and these rollers move on the bottom of the tracks or ways $a^7$, and the weight of the rods $j$ and the load carried thereby are properly supported at all times, the rollers $j^2$ at the tops of the shafts $j$ also aiding in accomplishing this result. The upright rods $j$ also move in slots $m$, formed in the annular raised portion of the platform $a^3$, and corresponding slots $m^2$, formed in the bottom $b^2$ in the top portion $b$ of the apparatus, and the slots $m$ correspond with and follow the same course as the tracks or ways $e^3$, in which the chains $f$ are mounted, and the slots $m^2$ are similarly arranged, and the rods $j$ are thus adapted to move in endless lines which cross each other at regular intervals.

Although I have shown and described the tracks or ways $e$, the slots $m$ in the base-cover $a^3$, and the corresponding parts in the top portion $b$ of the apparatus as crossing each other at regular intervals, it will be apparent that the distance between these intervals may not be the same in all cases and the crossing of said tracks or ways and said slots may be arranged in any desired manner, the driving mechanism for the chains $f$ being so arranged as to correspond with the form of the tracks or ways $e$ and the interceptions thereof, and said drive-chains may be of any desired or predetermined length. It will also be apparent that while the general form of the endless tracks or ways $e$ and slots $m$ and corresponding parts, as shown and described, is that of a circle, said tracks or ways and corresponding parts may be, as will be understood, arranged in other forms.

My invention is not limited to the exact details of construction herein shown and described, as it will be apparent that various changes therein and modifications thereof may be made without departing from the spirit of my invention or sacrificing the advantages thereof, and I reserve the right to make all such alterations in the construction herein shown and described as fairly come within the scope of the invention.

Having fully described my invention, what I claim as new, and desire to secure by Letters Patent, is—

1. In an apparatus of the class described, the combination of a plurality of pairs of shafts arranged in a circle and provided with sprocket-wheels, devices operating in connection with said shafts for turning the alternate pairs of shafts in opposite directions, tracks or ways arranged at the opposite sides of the sprocket-wheels of the separate pairs of shafts and crossing each other between said pairs, a plurality of pairs of drive-chains arranged in said tracks or ways and equaling in number one-half the number of pairs of shafts, and vertically-arranged supports connected with said drive-chains, substantially as shown and described.

2. In an apparatus of the class described, a platform, a plurality of pairs of shafts passing vertically through said platform, sprocket-wheels connected with said shafts, means for turning the separate pairs of shafts in opposite directions, tracks or ways arranged at the opposite sides of the alternate pairs of shafts and crossing each other between said pairs, a plurality of pairs of drive-chains mounted in said tracks or ways and in connection with which said sprocket-wheels operate, and vertically-arranged rods connected with said chains and provided with supports, substantially as shown and described.

3. An apparatus of the class described comprising top and bottom portions, a plurality of vertical shafts arranged in pairs and the ends of which are mounted in said top and bottom portions, sprocket-wheels connected with the upper and lower ends of said shafts, tracks or ways at the opposite sides of the sprocket-wheels of each of said pairs of shafts in the top and bottom portions of the apparatus and crossing each other between said pairs, a plurality of pairs of drive-chains placed in said tracks or ways in the top and bottom portions of the apparatus and adapted to operate in connection with said sprocket-wheels, vertically-arranged rods connecting the bottom and top drive-chains, supports connected with said rods and means for turning the separate pairs of shafts in opposite directions, substantially as shown and described.

4. An apparatus of the class described, comprising a central drive-wheel, a plurality of pairs of shafts arranged in a circle around said drive-wheel, said pairs of shafts being geared in connection with said drive-wheels so as to be turned in opposite directions and being also provided with sprocket-wheels, tracks or ways arranged on the opposite sides of the sprocket-wheels of the separate pairs of shafts and crossing each other between said pairs, a plurality of pairs of drive-chains mounted in said tracks or ways and equaling in number one-half the pairs of shafts and sprocket-wheels, and vertically-arranged supports connected with said chains, substantially as shown and described.

5. In an amusement apparatus of the class described, endless tracks or ways which intercept each other at intervals, drive-chains of predetermined length movable in said tracks or ways, and devices for moving said chains in opposite directions in said tracks or ways, substantially as shown and described.

6. In an amusement apparatus of the class described, endless tracks or ways which intercept each other at intervals, drive-chains of predetermined length movable in said tracks or ways and devices for moving said chains in opposite directions in said tracks or ways, said chains being also provided with supports, substantially as shown and described.

7. In an amusement apparatus of the class described, a plurality of endless tracks or ways arranged to cross each other at intervals, drive-chains of predetermined length mounted in said tracks or ways, vertically-arranged supports connected with said drive-chains and means for moving said chains in opposite directions through said tracks or ways, substantially as shown and described.

8. In an amusement apparatus of the class described, a plurality of endless tracks or ways arranged in the same horizontal plane and crossing each other at intervals, chains of predetermined length mounted in said tracks or ways and provided with supports, and means for moving said chains in opposite directions through said tracks or ways, substantially as shown and described.

9. In an amusement apparatus of the class described, an endless irregular track or way, drive-chains of predetermined lengths mounted in said track or way, and means for moving said chains through said track or way, substantially as shown and described.

10. In an amusement apparatus of the class described, an endless irregular track or way, drive-chains of predetermined lengths mounted in said track or way, and means for moving said chains through said track or way, said chains being also provided with supports, substantially as shown and described.

In testimony that I claim the foregoing as my invention I have signed my name, in presence of the subscribing witnesses, this 21st day of October, 1905.

CHARLES F. WEIDNER.

Witnesses:
C. J. KLEIN,
F. A. STEWART.